July 19, 1932.   A. W. GARDINER ET AL   1,867,553
PLANETARY FRICTION TRANSMISSION
Filed Oct. 19, 1931   2 Sheets-Sheet 1

Inventors
Arthur W. Gardiner
& Jacob Ehrlich
By Blackmore, Spencer & Flint
Attorneys Patented July 19, 1932

1,867,553

UNITED STATES PATENT OFFICE.

ARTHUR W. GARDINER AND JACOB EHRLICH, OF DETROIT, MICHIGAN, ASSIGNORS TO GENERAL MOTORS RESEARCH CORPORATION, OF DETROIT, MICHIGAN, A CORPORATION OF DELAWARE

PLANETARY FRICTION TRANSMISSION

Application filed October 19, 1931. Serial No. 569,733.

This invention relates to transmissions employing planetary motion of torque transmitting rollers where such rollers rotate on their own axes and the latter revolve around the main axis of the transmission and where the axes of the rollers may lie at an angle to the main transmission axis or otherwise than parallel thereto.

Such transmissions will usually be of the variable speed planetary type in which friction rollers are interposed between coaxial discs provided with annular toric grooves in their opposed faces, the rollers being mounted in roller carriers which are themselves mounted in a roller cage.

In its simplest form, one of the coaxial toric discs or races may be the driving member and the other disc a stationary member whilst the driven member is the roller cage carrying the planetary rollers. In another form such as that shown in British Patent 343,988 there may be two sets of rollers in parallel forming a double toric transmission in which the end races may be connected to rotate with the input shaft whilst a central race common to the two sets of planetary rollers may be held stationary, the driven shaft being connected to the roller cages, In any variable speed friction transmission of the toroidal type and whether planetary or otherwise, change ratio is effected by tilting each roller axis in a plane passing through the center of the roller and containing the main transmission axis.

The roller is tilted to a circle of contact of larger radius on one disc and of smaller radius on the other. This change of tilt and corresponding change or ratio may, through suitable controls for the rollers, be carried out directly or not. It may be the resultant motion from inclination (i. e. turning of the roller about an axis passing through the points of contact of the roller with the races) or from bodily displacement of the roller, all as hereinafter described. It is immaterial for the purposes of the present invention just how the change of tilt is effected.

In such a transmission, of the planetary type, the rollers have each a combination of angular velocities about two axes at an angle with each other whenever the axes of the rollers lie otherwise than parallel to the main transmission axis in planes containing the two axes of rotation.

Now when a mass rotates with a combination of angular velocities about two axes at an angle with each other, a gyroscopic torque is developed. In the case of the rollers in the transmission, this gyroscopic torque tends to turn or tilt the rollers in the plane (i. e. about an axis normal to such plane) passing through the centre of the roller and containing the main transmission axis. This torque tends to tilt the roller, with slippage at the points of contact, and to change the ratio.

It can be shown that the gyroscopic torque has such a direction as to shift or to tend to shift the roller toward a higher ratio of output to input shaft speeds.

This torque or tilting couple may, in actual practice at input shaft speeds of 3000 R. P. M., have a magnitude of more than twice that of the torque received and delivered as power by the roller itself.

These gyroscopic forces must be resisted, either by the friction at the roller contact points involving, in the immediately foregoing instance, a pressure between rollers and races more than twice that required to transmit the power, or they must be resisted in some way through the control means, if they are not otherwise balanced.

Increased axial loading to prevent the creep or tilt of a roller under the influence of the gyroscopic torque is undesirable as involving higher contact stresses and lower durability.

Furthermore, if for any reason there is a variation in contact capacity or loading among the rollers, it is possible under the influence of the gyroscopic forces for the rollers to get out of ratio relatively to one another with consequent destructive binding or slipping and loss of efficiency.

It should be noted that even if there were no gyroscopic or centrifugal forces tending to change the ratio of a variable speed friction transmission, it would still be possible for the rollers to tilt out of ratio relatively to one another as a result of variations in say contact capacity or loading unless the rollers, their mountings and control parts are made with sufficient accuracy and strength that all the rollers deliver a sufficiently equal amount of power at the same ratio and unless the roller support is rigid enough to have no yield effecting tilt by inclination, bodily displacement, or in any other way.

It is not, however, always convenient or commercially expedient to build a friction transmission in which no yield of the roller support with bodily displacement or inclination and consequent tilt with resultant change of ratio of any roller relatively to the others is possible.

For these and other reasons there is considerable advantage in designing the mechanism in such a way that an overloaded roller automatically changes its tilt very slightly and in a direction corresponding to a ratio position in which it carries a smaller load. The load through the rollers of such a transmission is thus "equalized".

Whether the transmission is "equalized" or "non-equalized" it is very desirable that where planetary operation is involved, some means, other than a resistance through increased axial loading or through the control means should be employed to prevent change of tilt and ratio under the influence of the gyroscopic torque and other forces peculiar to planetary operation.

The neutralization of the gyroscopic torque is very desirable in the equalized type in order that equalization shall not be interfered with and since the strength and especially the construction of the parts is equalized transmissions is not otherwise capable of absorbing or resisting the gyroscopic torque.

In addition to the gyroscopic torque there is a centrifugal torque due to the unequal radial disposition of the roller about the transmission shaft axis for all angular positions of the roller other than those in which the roller axis is either normal to the transmission shaft axis or parallel thereto. This centrifugal torque is reversed as the roller axis is tilted from one side to the other of the normal to the transmission shaft axis but is in the same direction as the gyroscopic torque for roller positions giving drive ratios of output to input greater than one to two.

The object of the invention is to provide means for counter-balancing or neutralizing these gyroscopic and centrifugal torques of which the gyroscopic torque is the principal one and to do this by incorporating a balance weight suitably mounted on each roller carrier. This counterweight will develop a centrifugal torque around the axis of the carrier opposing such undesirable forces tending to tilt the roller.

The accompanying drawings show the application of the invention to a single toric planetary variable speed friction transmission in which change of ratio is effected by tilt induced by bodily displacement of the rollers accompanied by restoration and in which equalization among the rollers is automatically effected. This embodiment has been chosen for purposes of example only and it will be understood that the invention is applicable to any transmission employing planetary motion of torque transmitting rollers where such rollers revolve on their own axes and the latter revolve around the main axis of the transmission and where the axes of the rollers may lie at an angle to the main transmission axis or otherwise than parallel thereto.

Figures 3, 4:
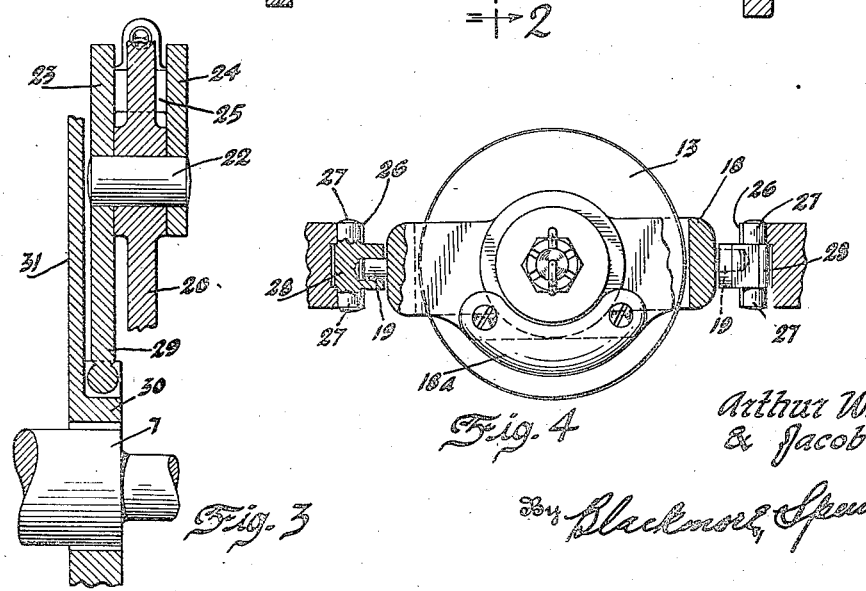
Figure 3 is an enlarged cross sectional view of one of the rockers in which the trunnion blocks for the roller carriers are mounted.
Figure 2:
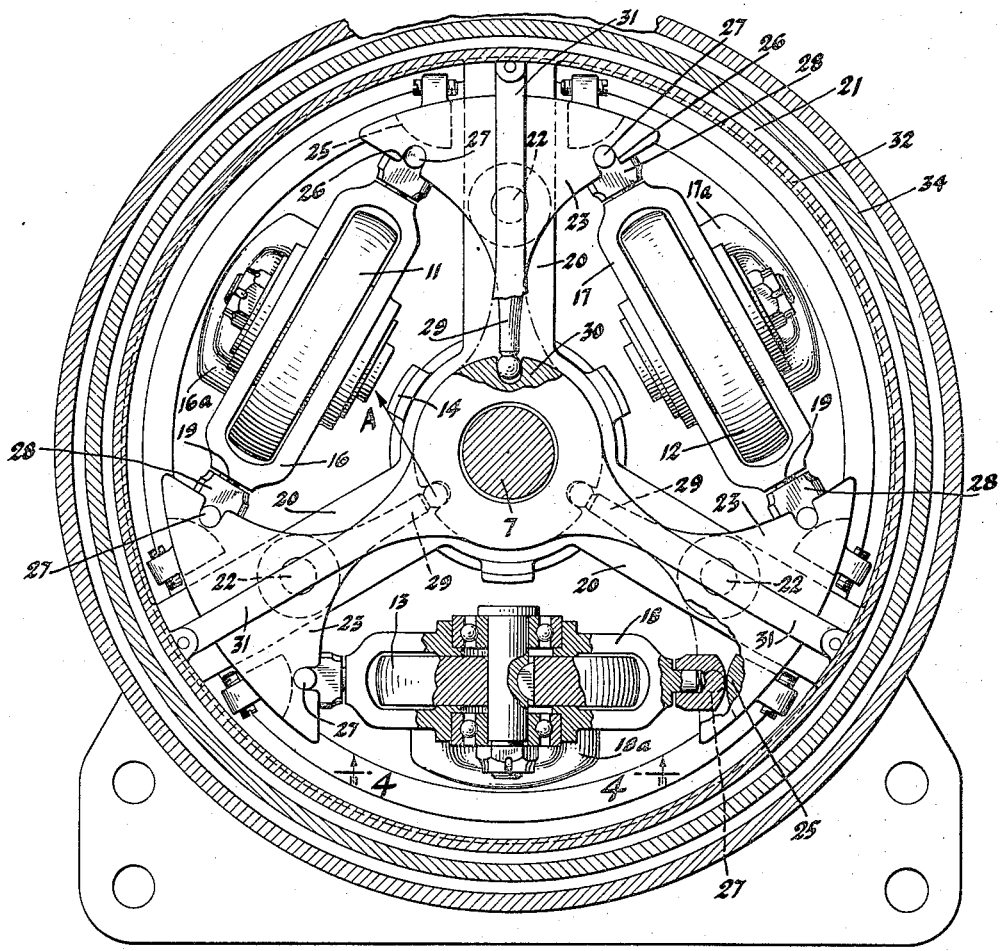
Figure 2 is a cross section taken about on line 2—2 of Figure 1 showing the mounting of the rollers.

Figure 4 is a detail part sectional view (taken about on line 4—4 of Figure 2) showing one of the roller carriers in which the rollers are mounted and the trunnion blocks in which the carriers are journaled to permit the carriers with the rollers to rock on axes at an angle to the axes on which the rollers rotate. A convenient way of mounting the roller carrier with its tilting axis inclined to the plane in which the roller revolves in planetary fashion around the axis of the discs is shown. The mounting of the counterweight to oppose gyroscopic and centrifugal forces is also shown.

Figure 5:
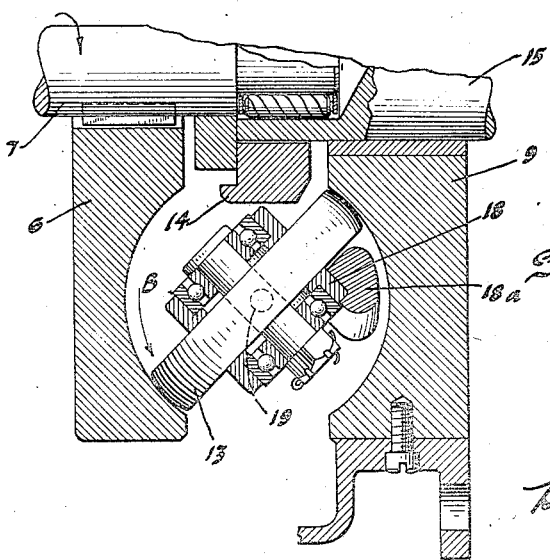

Fig. 5 is a part sectional view showing a roller tilted into a position corresponding to the highest ratio position of output to input shaft speed and the disposition on the carrier of the counterweight developing centrifugal forces opposing the combined resultant effect of the gyroscopic and centrifugal forces acting on the roller and carrier.

The driving disc 6, splined or slidably keyed on the driving shaft 7 is provided with a toric groove 8. The fixed stationary disc 9 is provided with a similar toric groove 10. Between the discs 6 and 9 are three transmission rollers 11, 12, 13, spaced 120° apart as in Fig. 2. The parts are pressed together to maintain engagement by a spring 7a.

The spider roller cage 14 is splined or slidably keyed to the driven shaft 15.

The rollers 11, 12, 13, are mounted in carriers 16, 17, 18. The spider or roller cage 14 has three arms 20 supporting an outer ring 21.

Pivoted at 22 on each arm is a rocker composed of a front plate 23 and a rear plate 24, connected by webs 25. Recesses 26 in the side edges of the chokes receive the trunnions 27 of the trunnion blocks 28 which carry the journals 19 of the roller carriers. The axes of the trunnions 27 are parallel to the axis of the transmission.

The roller carriers are thus supported approximately in the plane of the spider and between the arms thereof.

Figure 1:
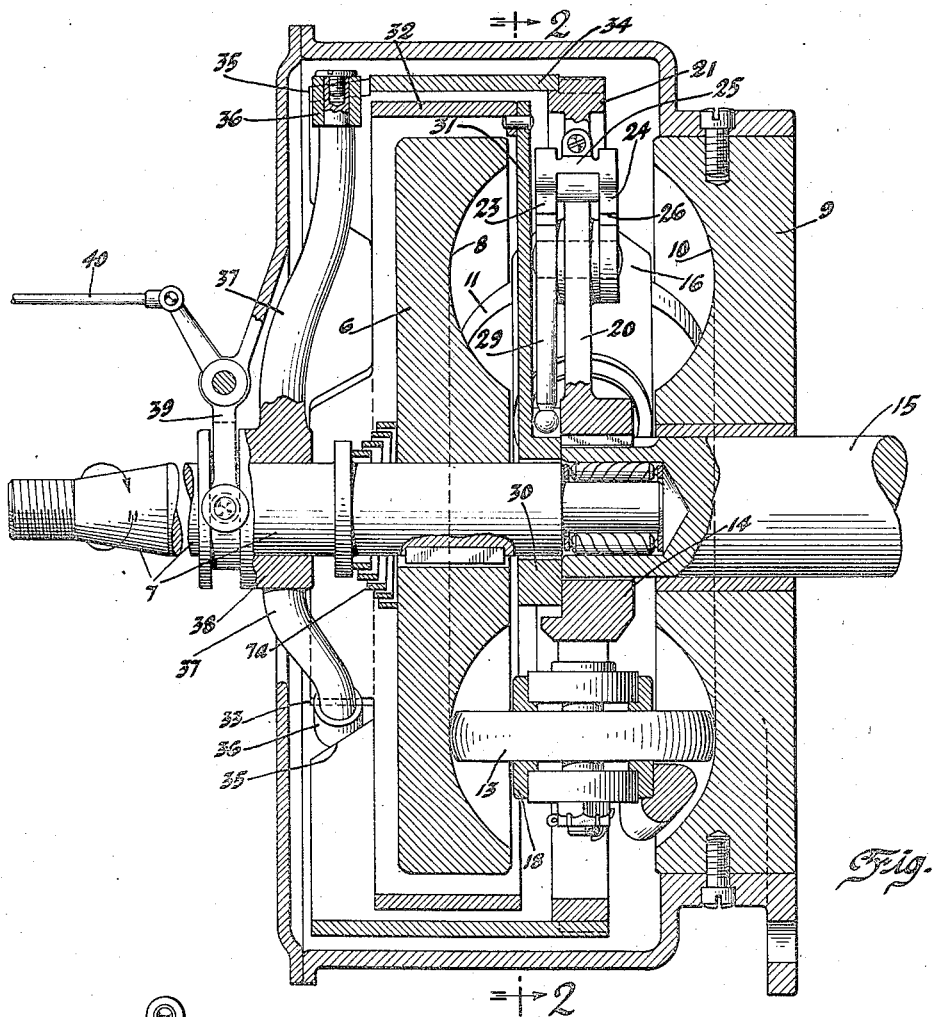
Figure 1 is a longitudinal central section in a vertical plane of a single toric planetary friction transmission embodying the invention.

Weights 16a, 17a, 18a are mounted on the roller carriers. They are shown in section in Figs. 1 and 5, whilst Figure 4 shows a convenient method of mounting if the weights are not integral with the roller carrier.

Fingers 29 extend radially inward from the rocker plates 23 and are equipped with ball ends engaging recesses in a ring 30 loosely encircling shaft 7. A slight rotary movement of ring 30 will turn the fingers 29 and with them the rockers 23 in an opposite direction about their pivots 22 thus shifting the roller carriers and effecting bodily displacement of the rollers from a position in which the roller axes intersect (i. e. are co-planar with) the axis of the discs into a position in which the axes are not co-planar. This is an unstable condition and the frictional forces acting on the roller will cause the roller to incline (i. e. to trace a spiral path on each disc) and the roller and carrier to turn i. e. "tilt" into a new ratio position on the carrier axis.

Assuming clockwise rotation of the driving shaft 7 and disc 6 (i. e. in the direction of the arrow on the shaft Fig. 1) a clockwise rotation of the ring 30 will result in a counter-clockwise bodily displacement of the roller relatively to disc 6, with a resultant tilt of the roller on to a larger radius of disc 6 and a smaller radius of disc 9 equivalent to a higher speed of the roller cage relatively to the disc 6 i. e. a higher gear ratio.

In order to effect a slight rotary movement of ring 30, the ring is connected to a drum shaped ring 32 by radial arms 31 and encircling this drum is a similar drum shaped ring 34 mounted on the ring 21 of roller cage 14. It will be seen that relative rotation of these two rings will result in the required relative rotation of ring 30 and bodily displacement of the rollers. The drum 34 is provided with cam edges 35 oblique to a radial plane and crossing the cam edges 33 of drum 32, which lie substantially in or parallel to a radial plane. Bowls 36 cooperating with the cam edges are carried by arms 37 extending radially from a sleeve ring 38 and rotatable relatively to the shaft 7. The sleeve is slidable in either direction through a fork 39 operated by shift rod 40 constituting the ratio control rod. Thus, when sleeve 38 is moved to the right in Fig. 1, the drum 32 and with it ring 30 will be given a clockwise movement relatively to drum 34 effecting change to a higher speed ratio as will be readily understood. It will be observed that the control can exert a cam action only in the direction to produce a higher speed ratio. Change to a lower speed ratio is effected by decreasing the force preventing movement of the sleeve 38 to the left which then moves to the left and to a lower speed ratio under the influence of the frictional resistance opposing transmission of power. For positive change of ratio in either direction, the drums may be provided with crossed cam slots not shown.

The bodily displacement described above which results in the projected roller axis being moved away from intersection of the disc or transmission axis is exactly the result produced by "inclination" by which is meant the turning of the roller about an axis passing through the points of contact of the roller and the disc races from a position from which the projected roller axis intersects (i. e. is co-planar with) the disc or transmission axis.

Whenever the axes are not co-planar and rotation exists the rollers will continue to change ratio position. It follows therefore that for any desired ratio the axes must be restored to co-planar condition just when the rollers begin to run on the race circles corresponding to the desired ratio. It is therefore necessary to provide some means whereby the normal motion of the parts in tilting cancels the bodily displacement or inclination which originated the tilting. This is achieved by arranging the axes of the roller carriers at an angle to the planes of the discs, as illustrated in Fig. 4. When now the roller is displaced to a position in which its axis does not intersect the disc axis and the roller tilts into a new ratio position, the projected axis of the roller does not move in a plane parallel to the disc or transmission axis but due to the angularity of the roller carrier axis is bound to move back to a position in which it intersects the transmission axis thereby reaching equilibrium in the new ratio position. The angularity of the roller carrier axis is so chosen that the roller axis will intersect the transmission axis after tilting before the roller can leave the toric surfaces of the races with the maximum displacement which the control mechanism can bring about.

In order to equalize the load among the rollers so that each receives and delivers an equal amount of power, it is necessary to permit an overloaded roller to receive the necessary bodily displacement to reduce its load. This can only occur automatically if, as in the transmission herein described, the roller control is torque responsive and the resistance to speed change proportional to the torque being transmitted. The necessary bodily displacement of an overloaded roller is permitted and effected in the following manner.

The ring 30 is provided with clearance about the shaft 7 and the arms 31 of the ring 30 and the drum 32 are sufficiently flexible and the slots engaging the ball ends of the arms 29 are deep enough to permit the ring 30 to move radially a small amount in any direction. There is a small amount of axial clearance of the ends of the carrier journals 19 in their bearings in the trunnion blocks 28. This makes it possible for one rocker 23 to turn slightly about its pin 22 without moving the adjacent rockers.

A part of the torque reaction of each roller is transmitted through the rockers 23 and the ball ends of the arms 29 to the ring 30. If all three arms 29 exert equal forces on the ring 30 the ring receives only a turning couple which is resisted by an equal couple supplied through the arms 31 but if the load on one of the rollers is greater, there will also be a force tending to move the ring 30 radially in the direction of the vector A. The motion will be practically parallel to the vector A, and will be permitted through the flexibility of the drum 32 with reference to forces applied normal to the surface of the drum. This radial motion will bring about equalization of the load by permitting a bodily displacement of the overloaded roller in a direction to cause it to tilt to a ratio angle where it tends to drive the roller cage at a slightly slower speed whilst the other rockers will be turned at the same time through small angles in the reverse direction with consequent bodily displacement and tilt to a ratio angle where they tend to drive the roller cage at a slightly faster speed. In this way equalization is obtained by adding load to the remaining rollers as load is removed from the overloaded roller.

Fig. 5 shows a roller tilted into a position corresponding to the highest ratio of output to input shaft speed. The counterweight 18a is mounted on the carrier 18 as far away as possible from the roller tilting axis 19 so that it will, with a minimum mass, have the greatest moment of inertia about this axis. It is further mounted so as to have the greatest moment about the said axis due to centrifugal force when the gyroscopic force tending to tilt the roller 13 in the direction of arrow B in Fig. 5 due to the roller speed both about its own axis and about the axis of the transmission is highest and to have a progressively decreasing centrifugal moment about the axis 19 as the roller tilts to a lower ratio position of output to input shaft speeds and the gyroscopic torque approaches its minimum.

The gyroscopic torque constantly tends to tilt the roller in the direction of the arrow B while the centrifugal torque of the counterweight is constantly in the opposite direction within the range of roller positions.

It will be seen that the position of the counterweight as shown in the drawings is the one that will best suit these conditions.

It will be seen, also, that a balance mass situated as described, will have a centrifugal moment opposing the centrifugal effects due to the unequal radial disposition of the roller and carrier about the roller carrier axis for all ratio positions of output to input shaft speed greater than one to two. In ratio positions of output to input shaft speed less than one to two the centrifugal torque of the counterweight will actually be augmented by the centrifugal torque on the roller and carrier but both the torque due to the counterweight and that due to the roller mass and carrier is of low amount at such lower ratio speeds and does not overbalance the gyroscopic torque at these lower ratio speeds.

We claim:

1. In a transmission gearing, a planetary torque transmitting roller and carrier therefor, the axis of said roller lying at an angle to the axis about which it has planetary motion, a counterweight mounted on the roller carrier, of such mass and in such a position that it will develop an opposing centrifugal torque counterbalancing the combined resultant effect of the gyroscopic forces and of the centrifugal forces due to roller position tending to tilt the roller in a plane passing through the center of the roller and containing the transmission axis.

2. In a transmission gearing, a planetary torque transmitting roller and carrier therefor, the speed ratio being varied by changing the angle at which the axis of said roller lies to the axis about which it has planetary motion, a counterweight mounted on the roller carrier, of such mass and in such a position that it will develop an opposing centrifugal torque counterbalancing the combined resultant effect of the gyroscopic forces and of the centrifugal forces due to roller position tending to tilt the roller in a plane passing through the center of the roller and containing the transmission axis.

3. In a transmission gearing, a planetary torque transmitting roller and carrier therefor interposed between coaxial torus discs, the speed ratio being varied by tilting the roller on to a circle of contact of larger radius on one disc and lesser radius on the other disc, the axis of said roller lying at an angle to the axis about which it has planetary motion, a counterweight mounted on the roller carrier, of such mass and in such a position that it will develop an opposing centrifugal torque counterbalancing the combined resultant effect of the gyroscopic forces and of the centrifugal forces due to roller position tending to tilt the roller in a plane passing through the center of the roller and containing the transmission axis.

4. In a variable speed transmission gearing, in combination, coaxial torus discs, a plurality of planetary torque transmitting rollers and carriers therefor interposed between said discs, means holding the discs and the rollers in frictional torque transmitting contact, means for causing the torque reaction of the frictional forces acting on the roller to tilt the rollers and change the speed ratio, means whereby the load carried by each roller is automatically equalized by a resultant tilt from a yielding displacement of an overloaded roller, and counterweights mounted on each roller carrier, of such mass and in such a position that they will develop an opposing centrifugal torque counterbalancing the combined resultant effect of the gyroscopic forces and of the centrifugal forces due to roller position tending to tilt the roller in a plane passing through the center of the roller and containing the transmission axis.

5. In a transmission gearing, in combination, two discs one of which is neither a driving nor a driven member, a planetary torque transmitting roller and carrier therefor interposed between said discs, an axis for the roller fixed relatively to the carrier and lying at an angle to the axis about which the roller has planetary motion, and a counterweight mounted on the roller carrier on that side of the roller farther away from the last mentioned axis and as near as possible to this axis on that side of the roller carrier nearest to the disc which is neither a driving nor a driven member, in a plane passing through the center of the roller and containing the transmission axis.

6. A planetary friction transmission mechanism including two discs, a torque transmitting planetary roller in tractive contact with said discs, a carrier for said roller, and a counterweight on the carrier at the side more remote from the disc axis.

In testimony whereof we affix our signatures.

ARTHUR W. GARDINER.
JACOB EHRLICH.

CERTIFICATE OF CORRECTION.

Patent No. 1,867,553.                                                          July 19, 1932.

ARTHUR W. GARDINER ET AL.

It is hereby certified that error appears in the printed specification of the above numbered patent requiring correction as follows: Page 1, line 31, after the word "change" insert the word of; page 2, line 37, for "is" read in; page 3, line 2, for "chokes" read rockers; and line 85, for "from" second occurrence read in; and that the said Letters Patent should be read with these corrections therein that the same may conform to the record of the case in the Patent Office.

Signed and sealed this 22nd day of November, A. D. 1932.

M. J. Moore, (Seal)                                                              Acting Commissioner of Patents.